United States Patent [19]
Taniguchi et al.

[11] Patent Number: 4,478,909
[45] Date of Patent: Oct. 23, 1984

[54] ANTI-FOGGING COATING FILM

[75] Inventors: Takashi Taniguchi, Shiga; Jiro Mibae, Otsu, both of Japan

[73] Assignee: Toray Industries, Inc., Tokyo, Japan

[21] Appl. No.: 313,168

[22] Filed: Oct. 20, 1981

[30] Foreign Application Priority Data

Oct. 24, 1980 [JP] Japan .................................. 55-148284
Oct. 27, 1980 [JP] Japan .................................. 55-149377

[51] Int. Cl.$^3$ .......................... B32B 5/16; B32B 9/04; B32B 13/12
[52] U.S. Cl. .................................... 428/331; 428/446; 428/447; 428/451; 428/428; 428/429; 428/448
[58] Field of Search ............... 428/428, 429, 448, 451, 428/447, 331, 446; 524/557, 264, 493; 525/61

[56] References Cited

U.S. PATENT DOCUMENTS

| | | | |
|---|---|---|---|
| 4,016,129 | 4/1977 | Miyosawa | 524/557 |
| 4,188,451 | 2/1980 | Humphrey, Jr. | 428/447 |
| 4,322,518 | 3/1982 | Blizzard | 428/447 |
| 4,324,712 | 4/1982 | Vaughn, Jr. | 428/447 |

Primary Examiner—Marion E. McCamish
Assistant Examiner—Beverly K. Johnson
Attorney, Agent, or Firm—Austin R. Miller

[57] ABSTRACT

An anti-fogging film derived from the curing of polyvinyl alcohol, finely divided silica and an organic silicon compound and a hydrolysate thereof which is capable of forming silanol by hydrolysis and having such a carbon/silicon element ratio that said ratio of the surface layer of the film is larger than that of the entire film, the production process thereof, and an article covered with said film are described. The above-mentioned film has an excellent anti-fogging property, surface hardness and good service durability.

12 Claims, No Drawings

ANTI-FOGGING COATING FILM

The present invention relates to an anti-fogging film having an excellent surface hardness and service durability.

Various kinds of plastic materials, inorganic glasses and the like are widely utilized as various articles such as, for example, window glasses, mirrors, eyeglass lenses or goggles, as they are transparent materials. However, there are disadvantages in that, when these materials are used under the conditions of high temperature and high humidity or at interfacial boundary having a large temperature difference and a humidity difference therebetween, the surface of the article is wet with dew and, therefore, is fogged. Especially, in the case of window glasses, eyeglasses, mirrors and the like, the fogging of the surface of the product and a tendency to flaw easily are serious problems. Accordingly, elimination of these problems is desired in various fields, and various proposals through which anti-fogging properties and service durability are incorporated into various articles and materials including transparent materials have been presented. For instance, as a very simple method for imparting an anti-fogging property to materials, coating or mixing of a hydrophilic substance such as a surface-active agent or surfactant has been proposed to improve wettability to the surface of articles (U.S. Pat. No. 3,479,308). However, all these methods can only temporarily impart the anti-fogging property to the article, and a long term anti-fogging property can not be expected.

The coating of a hydrophilic polymer has also been proposed to impart durability to the anti-fogging property. Among these proposals the use of polyvinyl alcohol has been proposed. For instance, as an anti-fogging agent, polyvinyl alcohol crosslinked with zirconium nitrate and formaldehyde has been proposed in U.S. Pat. No. 4,127,682. However, these anti-fogging agents are not satisfactory for improving the hardness. On the other hand it is known in U.S. Pat. No. 3,773,776 that polyvinyl alcohol crosslinked with finely divided silica can produce a coating film having water resistance.

Furthermore, curable coating compositions containing, as a main component, a complex of polyvinyl alcohol and silica has been proposed (U.S. Pat. No. 4,016,129). However, since all these proposals remarkably decrease the hydrophilic property of polyvinyl alcohol, the resultant materials are not suitable for use as anti-fogging coating materials. In addition, improvement in the abrasion resistance and anti-fogging properties by the use of discontinuous inorganic films and hydrophilic resins has been proposed (U.S. Pat. No. 3,895,155). However, the service durability of these materials is not sufficient. For instance, a swelling phenomenon occurs due to the low water resistance of the hydrophilic polymer.

Abrasion resistant coating compositions in which silane compounds and finely divided silica are used have been proposed (U.S. Pat. Nos. 4,027,073 and 4,211,823). However, although these compositions are especially effective for imparting a high degree of hardness to plastic materials, no anti-fogging properties are imparted thereto.

Generally speaking, even in the case where a component having high hydrophilic properties but poor abrasion resistance and another component having high abrasion resistance properties but poor hydrophilic properties are combined to prepare a mixture having the advantageous properties of both components, the advantage of each component, that is, the hydrophilic properties or the abrasion resistance are diluted by the mixing thereof. As a result, the serviceability of the resultant mixture of both components is poor. Furthermore, in the case where components having different physical properties are combined, problems in which the cured products become translucent often occur due to the poor compatibility.

Accordingly, an object of the present invention is to obviate the above-mentioned problems of the prior art and to provide a coating film having long term anti-fogging properties and surface hardness. According to the present invention, this object can be accomplished by a coating film having a surface layer having a different component ratio.

Other objects and advantages of the present invention will be apparent from the description set forth hereinbelow.

In accordance with the present invention, there is provided an anti-fogging coating film comprising a cured film derived from the following components A,B and C and coated on a substrate, the silicon content thereof being 0.7–2.0/1.0 in terms of carbon/silicon weight ratio, and the carbon/silicon weight ratio of the surface layer of the film being larger than that of the entire coating film and being not less than 1.7/1.0.
A: 100 parts by weight of polyvinyl alcohol,
B: 60–300 parts by weight of finely divided silica having an average particle size of about 5–200 nm,
C: 0.5–30 parts by weight of at least one compound selected from the group consisting of organic silicon compounds having a general formula:

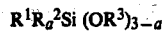

$$R^1R_a^2Si(OR^3)_{3-a}$$

wherein $R^1$ is an organic group having 1 to 10 carbon atoms, $R^2$ is a hydrocarbon group having 1 to 6 carbon atoms, $R^3$ is an alkyl, alkoxyalkyl or acyl group and $a=0$ or 1,
and the hydrolysates thereof.

In accordance with the present invention, there is also provided an article having, on the surface thereof, an anti-fogging film comprising a cured film derived from the following components A,B and C and coated on a substrate, the silicon content thereof being 0.7–2.0/1.0 in terms of carbon/silicon weight ratio and the carbon/silicon weight ratio of the surface layer of the film being larger than that of the entire coating film and being not less than 1.7/1.0.
A: 100 parts by weight of polyvinyl alcohol,
B: 60–300 parts by weight of finely divided silica having an average particle size of about 5–200 nm,
C: 0.5–30 parts by weight of at least one compound selected from the group consisting of organic silicon compounds having a general formula:

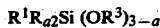

$$R^1R_a2Si(OR^3)_{3-a}$$

wherein $R^1$ is an organic group having 1 to 10 carbon atoms, $R^2$ is a hydrocarbon group having 1 to 6 carbon atoms, $R^3$ is an alkyl, alkoxyalkyl or acyl group and $a=0$ or 1,
and the hydrolysates thereof.

In accordance with the present invention, there is further provided a method for forming an anti-fogging coating film comprising a cured film derived from the following components A, B and C:

A: 100 parts by weight of polyvinyl alcohol,
B: 60–300 parts by weight of finely divided silica having an average particle size of about 5–200 nm,
C: 5–30 parts by weight of at least one compound selected from the group consisting of organic silicon compounds having a general formula:

$$R^1R^2_a Si(OR^3)_{3-a}$$

wherein $R^1$ is an organic group having 1 to 10 carbon atoms, $R^2$ is a hydrocarbon group having 1 to 6 cargon atoms, $R^3$ is an alkyl, alkoxyalkyl or acyl group and a=0 or 1,
and the hydrolysates thereof, said method comprising adding 0.05–20 parts by weight of a catalyst to 100 parts by weight of the component A to accelerate the curing.

In accordance with the present invention, there is still further provided a process for producing an anti-fogging film as set forth above, wherein a lower layer forming composition is first coated on a substrate and, then, a surface layer forming composition is coated thereon.

The polyvinyl alcohols used, as a component A, in the present invention include partially or fully hydrolysed polyvinyl esters such as polyvinyl acetate. Among these polyvinyl alcohols, polyvinyl alcohols having an average polymerization degree of 250–3,000 and a saponification degree of 70 mol % or more can be desirably used in the present invention. In the case where the average polymerization degree of the polyvinyl alcohols is less than 250, the service durability, especially water resistance, of the resultant coating film is poor. Contrary to this, in the case where the average polymerization degree is more than 3,000, the viscosity becomes large when the polyvinyl alcohols are incorporated into a coating composition and, therefore, there are problems in workability such that a smooth coating film is difficult to obtain. On the other hand, the saponification degree is less than 70 mol %, satisfactory anti-fogging properties can not be obtained.

Typical examples of finely divided silica having an average particle size of 5–200 nm, which are used as a component B in the present invention are silica sol. The silica sol is a colloidal dispersion in which high molecular weight silicic anhydride is dispersed in water and/or an organic solvent such as alcohols. In order to accomplish the object of the present invention, the finely divided silica having an average particle size of about 5–200 nm is generally used, and the finely divided silica having an average particle size of about 7–50 nm is more desirably used. In the case where the average particle size is less than about 5 nm, the stability of the dispersion is poor and, therefore, a coating film having constant properties is difficult to obtain. Contrary to this, in the case where the average particle size is more than 200 nm, the transparency of the resultant coating film is poor, and only a cloudy coating film is obtained.

The organic silicon compounds having a general formula $$R^1R^2_a Si(OR^3)_{3-a}$$

which are used as component C in the present invention have such functions that the water resistance is improved and also that the adhesion properties with a substrate are also improved. Typical examples of these organic silicon compounds are:

β—glycidoxyethyl trimethoxy silane,
γ—glycidoxypropyl trimethoxy silane,
γ—glycidoxypropyl triethoxyl silane,
β—glycidoxypropyl trimethoxy silane,
β—blycidoxyethyl methyl dimethoxy silane,
β—glycidoxyethyl methyl diethoxy silane,
γ—glycidoxypropyl methyl dimethoxy silane,
γ—glycidoxypropyl methyl diethoxy silane,
β—glycidoxyethyl ethyl diethoxy silane,
γ—glycidoxypropyl ethyl dimethoxy silane,
γ—glycidoxypropyl ethyl dimethoxy silane,
β—glycidoxypropyl ethyl diethoxy silane,
γ—glycidoxyethyl propyl dimethoxy silane,
β—(3,4-epoxy cyclohexyl) ethyl trimethoxy silane,
β—(3,4-epoxy cyclohexyl) ethyl triethoxy silane,
Methyl trimethoxy silane,
Methyl triethoxy silane,
Vinyl trimethoxy silane,
Vinyl triethoxy silane,
Vinyl triacetoxy silane,
Vinyl trimethoxyethoxy silane,
γ—chloropropyl trimethoxy silane,
γ—chloropropyl triethoxy silane,
γ—chloropropyl tripropoxy silane,
γ—chloropropyl tributoxy silane,
phenyl trimethoxy silane,
phenyl triethoxy silane,
γ—trifluoropropyl trimethoxy silane,
γ—methacryloxypropyl trimethoxy silane,
dimethyl dimethoxy silane,
γ—chloropropyl methyl dimethoxy silane,
γ—methacryloxypropyl methyl dimethoxy silane,
and the like. These compounds can be used alone or in any mixture thereof.

In the case where the above-mentioned organic silicon compounds used as a component C, the organic silicon compounds can be added as component C as they are, or the organic silicon compounds can be added in the form of hydrolysate after the compounds have been hydrolysed. The hydrolysis can be carried out in any conventional manner, for example, by using an inorganic acid such as hydrochloric acid or the like, an organic acid such as acetic acid or the like, or an alkali such as sodium hydroxide or the like, or by using only water.

The coating film of the present invention contains, as essential components, the above-mentioned components A, B and C. In the case where either one of these components is not present, the coating film having the desired anti-fogging properties and service durability can not be obtained.

Furthermore, the coating film of the present invention is a cured coating film in which the surface layer thereof contains a relatively large amount of the component A, as compared with the entire coating film. The term "surface layer" used herein means the portion where the coating film contacts the atmosphere and where it is distinguished from the underlying layer in the compositions thereof.

In order to improve the adhesion properties with a coating film, a substrate to be coated with the coating film can be previously subjected to physical treatments such as an activated gas treatment and sand blast, chemical treatments using, for example, acids, bases, oxidizing agents and the like, or the substrate can be coated with primers.

As mentioned hereinabove, the silicon content of the anti-fogging coating film should be 0.7–2.0/1.0 in terms of carbon/silicon weight ratio and the carbon/silicon weight ratio of the surface layer of the coating film should be larger than that of entire coating film and be not less than 1.7/1.0. In the case where the silicon contained in the entire coating film is less than the above-mentioned range, the water resistance and the hardness of the coating film are not satisfactory. Contrary to this, in the case where the silicon contained is larger than the above-mentioned range, the anti-fogging properties tend to be decreased. In the case where the carbon/silicon weight ratio of the surface layer of the coating film is not larger than that of the entire film, or in the case where the carbon/silicon weight ratio of the surface layer is less than 1.7/1.0, the anti-fogging properties are not satisfactory.

As mentioned hereinabove, the amounts of the component B and the component C should be used 60–300 parts by weight and 0.5–30 parts by weight, respectively, based on 100 parts by weight of the component A, in the present invention. In the case where the component B is less than 60 parts by weight, the hardness and the water resistance of the coating film are not satisfactory. Contrary to this, in the case where the amount of the component B is more than 300 parts by weight, the anti-fogging properties are decreased and undesirable cracks are generated during and after curing. On the other hand, where the amount of the component C is less than 0.5 parts by weight, the water resistance of the coating film is remarkably decreased. Contrary to this, where the amount of the component C is more than 30 parts by weight, satisfactory anti-fogging properties of the coating film are not obtained.

The film thickness of the surface layer of the coating film is desirably 0.001–0.5 $\mu$m. In the case where the film thickness is thinner than the lower limit of the above-mentioned range, the anti-fogging properties tend to be decreased. Contrary to this, in the case where the film thickness is thicker than the upper limit of the above-mentioned range, the water resistance tends to be decreased.

On the other hand, where the amount of the components B and C of the entire coating film are less than the above-mentioned values, the water resistance and surface hardness are undesirably decreased. Contrary to this, in the case where said amount is larger than the above-mentioned value, undesirable cracks are generated during the curing or after the curing and, therefore, the coating film is deteriorated. The film thickness of the entire coating film is desirably 0.1 $\mu$m or more. In the case where the thickness is less than 0.1 $\mu$m, the anti-fogging properties tend to be insufficient and the hardness also tends to be decreased. Although there is no limitation in the thicker side of the film thickness, a coating film having a film thickness of about 30 $\mu$m or less can be desirably used in view of the coating workability.

The coating film forming composition used in the present invention can contain, in addition to the above-mentioned essential components, solvents, additives, various kinds of modifiers and the like.

The solvents optionally used in the present invention include, for example, water, various kinds of alcohols, ketones, esters, ethers, cycloethers, dimethyl formamide, dimethyl sulfoxide and the like.

The additives optionally used in the present invention include, for example, various kinds of surfactants for improving the surface smoothness. Examples of such surfactants are silicon compounds, fluorine-containing surfactants, organic surfactants and the like. Examples of the modifiers optionally used in the present invention are organic polymers having good compatibility with the coating film forming composition used in the present invention such as, for example, hydroxyethyl cellulose, polyhydroxyethyl cellulose, polyhydroxyethyl methacrylate, or the copolymers thereof; alcohol-soluble nylon, polyacrylamide, polyvinylpyrrolidone and the copolymers thereof; and the like. Furthermore, tetrafunctional silane compounds such as silicate, n-propyl silicate, i-propyl silicate, n-butyl silicate, i-butyl silicate, t-butyl silicate and the like can be also added. The modifiers optionally used in the present invention are, for example, various kinds of epoxy resins, melamine resins, amide resins and the like.

In addition, various kinds of known catalysts for the condensation of silanols or the reaction of silanols with a hydroxy group can be optionally used in order to accelerate the curing reaction. Examples of the desirable catalyst are aluminum chelate compounds having a general formula:

$$Al \cdot X_n \cdot Y_{3-n}$$

wherein X is a lower alkoxy group; Y is a ligand derived from the compounds selected from the group consisting of $M^1COCH_2COM^2$ and $M^3COCH_2COOM^4$ in which $M^1$, $M^2$, $M^3$ and $M^4$ are independently lower alkyl groups; n is 0, 1 or 2.

Various kinds of compounds can be used as the aluminum chelate compounds. Examples of such aluminum chelate compounds, which are desirable in view of the catalyst activity, the solubility in the composition and the stability, are aluminum acetylacetonate, aluminum ethylacetoacetate bisacetylacetonate, aluminum di-n-propoxide monomethyacetoacetate and the like. These compounds can be used alone or in any mixtures thereof.

The above-mentioned catalyst components can be used in an amount of 0.05–20 parts by weight, based on 100 parts by weight of the components A. In the case where the amount of the catalyst components is too small, the strength, especially the hardness, of the coating film after dipping in water, is decreased and also problems such as poor adhesion properties, decrease in the transparency and the like are generated. Contrary to this, in the case where the amount of the catalyst component is too large, poor transparency of the coating film is caused. The preferable range of the amount of the catalyst component is 0.1–10 parts by weight, based on 100 parts by weight of the component A.

The above-mentioned additive components, other than the above-mentioned essential components, impart heat resistance, weatherability, water resistance, adhesion properties or chemical resistance to the coating film formed from the anti-fogging composition of the present invention and can improve various practical characteristics required in the field of the application of the coating film.

As long as the transparency is not impaired, dyes and pigments can be added to the surface layer, or the underlying layer or both layers of the coating film of the present invention, whereby the cured film obtained from the composition can be colored.

In order to prepare the composition used in the present invention, for instance, each component can be simply mixed with one another, or certain components are mixed with other components after being hydrolysed. However, it should be noted that the preparation of the composition used in the present invention is by no means limited to these methods, although these methods are useful in the preparation of the present composition.

The surface layer of the coating film of the present invention having a different composition, as compared with the composition of the entire coating film, can be prepared in various manners. Examples of these preparation processes are:

(a) The underlying layer forming composition is first coated on a substrate, and the surface layer forming composition is then coated thereon (two coating method);

(b) After the composition for forming the coating film corresponding to the underlying layer is coated on a substrate, the resultant coating film is dipped in water or heated water, or in an organic solvent, and is further subjected to a treatment under a high humidity;

(c) After the underlying layer is formed in a manner as mentioned in (b) above, the resultant coating film is subjected to an abrasion treatment.

In the case (a) above, after the underlying layer forming composition is coated and cured, the surface layer forming composition can be coated and cured, or after the underlying layer forming composition is coated and the setting thereof is carried out, the surface layer forming composition can be coated thereon (so-called "wet-on-wet coating") and coated films having different compositions can be cured at once.

The curing of the coated film can be generally carried out at a temperature of 50°–250° C. In the case where the curing temperature is too low, the curing is not sufficient, whereas if the curing temperature is too high, it causes discoloration and deterioration of the resultant coating film.

In the case (b) above, the temperature at which the coated film is dipped in water or heated water, or an organic solvent is generally 40°–100° C., more desirably 50°–100° C. Furthermore, although a dipping time of, for example, a few or several may show certain effects, generally speaking, a dipping time of 10–120 minutes is advantageously used in the present invention. In addition, as the high humidity treatment condition in the latter of the case (b) above, the condition having a higher humidity is preferably. Generally speaking, a relative humidity having a range of 70–100% is effective. Furthermore, the combined use of heating under a high humidity can be expected to shorten the treatment time.

On the other hand, in the treatment (c) above, the surface of the coated film can be wiped with soft materials such as fabrics (e.g. gauze), non-woven fabric and the like, or paper, or materials which have softness by, for example, wetting the same with water. The wiping of the surface of the coated film mentioned above can be carried out by hand or can be mechanically carried out. The wiping times can be determined, depending on the desired effect.

In addition, after the treatment in the case (b) above, in order to remove the water or organic solvent contained in the coating film, the treated coating film can be heated and dried. However, these heating and drying operations are not necessary required, and, therefore, the necessity of these operations can be optionally determined, depending upon the intended use of the coating film of the present invention.

As mentioned hereinabove, the coating film of the present invention can impart anti-fogging properties and surface hardness to the substrate. In addition, since the coating film of the present invention has permeability to disperse dye, dying can be advantageously carried out after the formation of the coating film.

The coating film of the present invention may be treated by any of the following methods: dipping in a dyeing bath containing a disperse dye, dyeing utilizing a printing dye paper containing a sublimation dye, printing by dye ink, and the patterning with hand-writing.

The anti-fogging coating film of the present invention can be applied to various kinds of substrates and there is no limitation with respect to the substrate as long as the characteristics of the present coating film are not impaired. The substrates which may be suitably coated with the present coating film composition are, for example, plastics, inorganic glasses, transparent ceramics, metals, mirror materials and the like. In practice, the coating film of the present invention can be preferably applied to, for example, glass lenses made of plastics and inorganic glasses, windows in bath rooms and the like, windows of automobiles or tram cars or the like.

The coating film of the present invention can be applied to substrates by conventional methods known in the art, for example, brush coating, dip coating, spin coating, flow coating, spray coating, roll coating, curtain flow coating and the like.

The present invention will now be further illustrated by, but is by no means limited to, the following Examples and Comparative Examples, wherein all percentages are expressed on a weight basis unless otherwise noted.

EXAMPLE 1

1. Preparation of γ—Glycidoxypropyl Trimethoxy Silane Hydrolysate 236 g of γ—glycidoxypropyl trimethoxy silane was charged to a reaction vessel provided with a rotor, and the liquid temperature was maintained at a temperature of 10° C. While the liquid was agitated by a magnetic stirrer, 54 g of a 0.01N aqueous hydrochloric acid solution was gradually added dropwise. After the dropwise addition, the cooling was stopped. Thus, the hydrolysate of γ—glycidoxypropyl trimethoxy silane was obtained.

2. Preparation of Coating Composition 250 g of a 15% aqueous polyvinyl alcohol (AL-06, available from NIHON GOUSEI KAGAKU KOGYO, saponification degree of 91.0–94.0 mol %) was weighed in a beaker. Then, 28 g of water, 10.4 g of γ—glycidoxypropyl trimethoxy silane hydrolysate obtained above and 105 g of colloidal silica dispersed in methanol (CATALOID- S, available from SHOKU-BAI KASEI KOGYO, solid content of 30%, average particle size of 13±1 nm) were added with stirring. To this mixed dispersion 105 g of 1,4-dioxane, 0.24 g of fluorine-containing surfactant and 1.5 g of aluminum acetylacetonate were added and thoroughly mixed with stirring. Thus, the coating composition (A) was obtained. The silicon contained in the film forming component of this coating composition was about 1.6 in terms of carbon/silicon ratio.

A coating composition (B) was prepared in a manner as described in the preparation of the coating composition (A), except that 307 g of the polyvinyl alcohol, 77 g of the colloidal silica dispersed in methanol, 10 g of water and 95 g of 1,4-dioxane were used. Thus, the coating composition (B) was prepared. The silicon contained in the film forming component of this coating composition was about 2.5 in terms of carbon/silicon weight ratio.

3. Coating and Curing

To the surface of a diethyleneglycol bisallyl carbonate polymer lens which was previously dipped in an aqueous sodium hydroxide solution ("CR-39 plano lens" available from RIKEN LENS KOGYO, 75 mm diameter, 2.1 mm thickness), the coating composition (A) obtained above was first coated by means of a dipping method with a pickup rate of 5 cm/min and, then, dried under heating for 10 minutes in an air drying oven at a temperature of 80° C. Then, the coated lens was overcoated with the coating composition (B) diluted twice with water by means of a dipping method with a pickup rate of 5 cm/min. and, then, heat cured for 2 hours in the air drying oven at a temperature of 130° C. The film thickness of the coating composition (A) was 4 μm and the film thickness of the coating composition (B) 0.5 μm. The carbon/silicon weight ration on the entire coating film was about 1.7.

4. Test Results

The following tests were carried out with respect to the coated lens obtained above. The results are shown in Table 1 below.

(a) Coating Film Strength

The lens sample was dipped for 60 min. in heated water at a temperature of 90° C., and was subjected to an abrasion treatment. Thus the stability of the coating film (whether or not the film was rubbed off) was evaluated.

(b) Appearance

The transparency, the existence of smear and the like were visually observed.

(c) Adhesion Property 100 squares each having a size of 1 mm×1 mm were marked on the coated surface of the lens with a steel knife in such a manner that the cutting lines reached through the coating surface. Pressure-sensitive adhesion tapes ("Cello-tape", available from NICHIBAN KABUSHIKI KAISHA) were strongly bonded to the upper surface of the coating film and, then, the tapes were rapidly peeled off from the surface at a direction of 90°. Thus, the number of the squares of the coating film peeled off were observed.

(d) Anti-Fogging Test

After the coated lens was allowed to stand for one day in a room having a relative humidity of 50% (i.e. 50% RH), the occurrence of fogging was observed when breath was applied. The untreated CR-39 lens was entirely fogged immediately after the breath was applied.

COMPARATIVE EXAMPLE 1

The coating, curing and tests of Example 1 were repeated in a manner as described in Example 1, except that the coating composition (B) was not used. The results are shown in Table 1 below.

COMPARATIVE EXAMPLE 2

The coating, curing and tests of Example 1 were repeated in a manner as described in Example 1, except that the coating composition (A) was not used. The results are shown in Table 1 below.

EXAMPLE 2

1. Preparation of Vinyl Triethoxy Silane Hydrolysate 190 g of vinyl triethoxy silane was charged to a reaction vessel provided with a rotor. While the liquid was maintained at a liquid temperature of 10° C. and was stirred with a magnetic stirrer, 54 g of a 0.05 N aqueous hydrochloric acid solution was gradually added dropwise thereto. After the completion of the dropwise addition, the cooling was stopped. Thus, the hydrolysate of vinyl triethoxy silane was obtained.

2. Preparation of Coating Film 230 g of a 15% aqueous polyvinyl alcohol solution (AL-06 available from NIHON GOUSEI KAGAKU KOGYO, saponification degree of 91.0–94.0 mol%) was weighed in a beaker. Then, 42 g of water, 18.5 g of vinyl triethoxy silane hydrolysate obtained above and 115 g of colloidal silica dispersed in methanol (CATALOID- S, available from SHOKUBAI KASEI KOGYO, solid content of 30%, average particle size of 13±1 nm) were added. To the mixed dispersion, 105 g of 1,4-dioxane, 0.24 g of fluorine-containing surfactant and 1.5 g of aluminum acetylacetonate were added and thoroughly agitated to mix with one another. Thus, coating composition (C) was prepared. The silicon content of the film forming component in this coating composition was about 1.2 in terms of carbon/silicon weight ratio.

102 g of a 15% aqueous polyvinyl alcohol solution (AL-06, available from NIHON GOSEI KAGAKU KOGYO, saponification degree of 91.0–94.0 mol %) was weighed in a beaker. Then, to this solution, 33.3 g of water, 3.5 g of γ—glycidoxypropyl trimethoxy silane hydrolysate and 26 g of colloidal silica dispersed in methanol (CATALOID- S, available from SHOKUBAI KASEI KOGYO, solid content of 30%, average particle size of 13±1 nm) were added. To the mixed dispersion, 35 g of 1,4-dioxane, 0.08 g of fluorine-containing surfactant and 0.5 g of aluminum acetylacetonate were added and thoroughly mixed with one another under agitation. Thus, coating composition (D) was prepared. The silicon content in the film forming component of this coating composition was about 2.5 in terms of carbon/silicon weight ratio.

3. Coating and Curing

The coating, curing and tests of Example 1 were repeated in a manner as described in Example 1, except that the coating composition (A) was replaced with coating composition (C) and coating composition (B) was replaced with coating composition (D). The film thickness of the component (C) in the coating film was 3.5 μm and the film thickness of the component (D) was 0.5 microns. The carbon/silicon weight ratio of the entire coating film was about 1.4.

EXAMPLE 3

1. Preparation of Coating Composition

Coating composition (E) was prepared in a manner as described in the preparation of coating compositon (D), except that the amounts of the polyvinyl alcohol, the colloidal silica dispersed in methanol and water were changed to 97 g, 28 g and 336 g, respectively. The silicon content in the film forming composition of the coating composition (E) thus prepared was about 2.2 in terms of carbon/silicon weight ratio.

2. Coating and Curing

The coating, curing and tests of Example 2 were carried out in a manner as described in Example 2, except that coating composition (D) was replaced with coating composition (E). The film thickness of component (C) of the coating film was 3.5 μm and the film thickness of component (E) was 0.4 μm. The carbon/silicon weight ration of the entire coating film was about 1.3.

The lens thus obtained was dyed by using a commercially available disperse dye in such a manner that the lens was dipped for 15 minutes in a dyeing bath at a temperature of 93° C.

The total light transmittance of the dyed lens was 38.2%. Even in the case where the dyed lens was subjected to a light resistance test in which the lens was dipped in heated water for 5 hours at a temperature of 60° C. and was irradiated by a fademeter for 20 hours, only a little fading occurred. Thus, the dyed lens showed a good color fastness.

EXAMPLE 4

1. Preparation of Coating Composition

A coating composition (F) was prepared in a manner as described in the preparation of coating composition (D), except that the amounts of the polyvinyl alcohol, the colloidal silica dispersed in methanol and water were changed to 92 g, 31 g and 338 g, respectively. The silicon content of the film forming composition in the coating composition (F) was about 1.9 in terms of carbon/silicon weight ratio.

2. Coating and Curing

The coating, curing and tests were carried out in the manner as described in Example 2, except that coating composition (D) of Example 2 was replaced with the coating composition (F). The film thickness of component (C) in the coating film was 3.8 μm and the film thickness of component (F) was 0.4 μm. The carbon/silicon weight ratio of the entire coating film was about 1.3.

COMPARATIVE EXAMPLE 3

1. Preparation of Coating Composition (G)

Coating composition (G) was prepared in a manner as described in the preparation of coating composition (D), except that the amounts of the polyvinyl alcohol, the colloidal silica dispersed in methanol and water were changed to 77 g, 38 g and 346 g, respectively. The silicon content in the film forming component of this coating composition was about 1.3 in terms of carbon/silicon weight ratio.

2. Coating and Curing

The coating, curing and tests of Example 2 were repeated in a manner as described in Example 2, except that coating composition (D) of Example 2 was replaced with coating composition (G). The film thickness of component (C) in the coating film was 3.5 μm and the film thickness of component (G) was 0.4 μm. The carbon/silicon weight ratio of the entire film was 1.2.

EXAMPLE 5

1. Primer (a) Preparation of γ—Glycidoxypropyl Methyl Diethoxy Silane Hydrolysate 386.3 g of γ—glycidoxypropyl methyldiethoxy silane was charged to a reaction vessel provided with a roter. The liquid temperature was maintained at a temperature of 10° C. While the liquid was stirred with a magnetic stirrer, 55.8 g of a 0.05N aqueous hydrochloric acid solution was gradually added dropwise thereto. After the completion of the dropwise addition, the cooling was stopped. Thus, the hydrolysate of γ—glycidoxypropyl methyl diethoxy silane was obtained.

(b) Preparation of Coating Composition for Primer 442.1 g γ—glycidoxypropyl methyl diethoxy silane hydrolysate obtained above, 97.3 g of Epikote 827 (bisphenol A type epoxy resin, available from Shell Chemical Co., Ltd, epoxy equivalent of about 185), 58.9 of Epikote 834 (bisphenol A type epoxy resin, available from Shell Chemical Co., Ltd, epoxy equivalent of about 250), 77.7 g of Denacol EX 320 (trimethylolpropane polyglycidyl ether, available from NAGASE SANGYO KABUSHIKI KAISHA, epoxy equivalent of about 130). 235.4 g of diacetone alcohol, 118.6 g of benzyl alcohol and 4.2 g of silicone surfactant were thoroughly mixed with one another. After the mixture was in a dissolved form, 1.678.6 of colloidal silica dispersed in methanol (methanol silica sol, available from NISSAN KAGAKU KABUSHIKI KAISHA, solid content of 30%, average particle size of 13±1 nm) was added with stirring. To the mixed dispersion, 50.6 g of aluminum acetylacetonate was added and mixed with stirring. Thus, the desired coating composition was prepared.

(c) Preparation of Primer

A polycarbonate lens (made of LEXAN-141, available from General Electric Co. Ltd., 60 mm diameter, 3.0 mm thickness) was coated with the coating composition obtained above by using a dipping method with a pickup rate of 10 cm/min., and heat cured 2 hours in an air drying oven at a temperature of 130° C. The lens after curing was subjected to an activated gas treatment under the following conditions, whereby the primer was prepared.

Apparatus: Plasma reactor 501 A type (YAMATO KAGAU KABUSHIKI KAISHA) was used.

Gas: Oxygen
Gas flow rate: 100 cc/min.
Power: 50 Watt
Treating time: 5 min.

2. Coating Composition, Coating and Curing

The tests of Example 1 were repeated in a manner as described in Example 1, except that the lens treated above was used. The results are shown in Table 1 below.

TABLE 1

| | C/Si Wt. Ratio | | Test Result | | | |
|---|---|---|---|---|---|---|
| Example No. | Surface Layer | Entire Film | Water Resistance | Adhesion | Appearance | Anti-Fogging |
| Example 1 | 2.5 | 1.7 | Good | Good | Good | No Fogging |
| Comparative Example 1 | 1.6 | 1.6 | " | " | " | Fogging occurs immediately after breath |
| Comparative 2 | 2.5 | 2.5 | Poor | " | " | No Fogging |
| Example 2 | 2.5 | 1.4 | Good | " | " | " |
| Example 3 | 2.2 | 1.3 | " | " | " | " |
| Example 4 | 1.9 | 1.3 | " | " | " | " |
| Comparative | 1.3 | 1.2 | " | " | " | Fogging occurs |

TABLE 1-continued

| Example No. | C/Si Wt. Ratio Surface Layer | C/Si Wt. Ratio Entire Film | Water Resistance | Adhesion | Appearance | Anti-Fogging |
|---|---|---|---|---|---|---|
| Example 5 | 2.5 | 1.7 | " | " | " | immediately after breath No Fogging |

EXAMPLE 6

1. Preparation of Coating Composition 500 g of a 15% aqueous polyvinyl alcohol (AL-06) solution was weighed in a beaker. To the solution, 53.3 g of water, 18.2 g of γ—glycidoxypropyl trimethoxy silane hydrolysate prepared in a manner as described in Example 1 and 215 g of colloidal silica dispersed in the methanol (solid content 30%, average particle size of 13±1 mm) were added. To the mixed dispersion, 210 g of 1,4—dioxane, 0.5 g of fluorine-containing surfactant and 3 g of aluminum acetylacetonate were added and thoroughly mixed with stirring. Thus, coating composition (H) was prepared.

2. Coating and Curing

A diethyleneglycol bisallyl carbonate polymer lens (CR-39) plano lens, 75 mm diameter, 2.1 mm thickness) previously subjected to a dipping treatment in an aqueous sodium hydroxide solution was coated with coating composition (H) obtained above by using a dipping method with a pickup rate of 10 mm/min. and heat cured for 2 hours in an air drying oven at a temperature of 130° C. The total thickness of the coating film thus obtained was about 5 μm and the weight ratio of carbon/silicon was about 1.5.

3. Wet Heat Treatment

After the heat curing, the resultant lens was dipped in heated water having a given temperature for 60 min. and dried for 30 min at a temperature of 80° C.

4. Test Result

The test similar to those of Example were carried out. The results are shown in Table 2 below. The carbon/silicon weight ratio of the surface layer was calculated from the analytical results obtained from electron spectroscopy for chemical analysis (ESCA).

COMPARATIVE EXAMPLE 4

The experiment of Example 6 was repeated in a manner as described in Example 6, except that the heated water treatment was not carried out. The results are shown in Table 2.

temperature was maintained at a temperature of 10° C. While the liquid was agitated with a magnetic stirrer, 54 g of a 0.01N aqueous hydrochloric acid solution was gradually added dropwise thereto. After the completion of the dropwise addition, the cooling was stopped. Thus, the desired methyl trimethoxy silane hydrolysate was obtained.

2. Preparation of Coating Composition

Coating composition (I) was prepared in a manner as described in Example 6, except that 29.7 of the methyl trimethoxy silane hydrolysate obtained above was used, in lieu of the γ—glycidoxypropyl trimethoxy silane hydrolysate of Example 6.

3. Coating, Curing and Wet Heat Treatment

The coating, curing and wet heat treatment (at 90° C.) were carried out in a manner as described in Example 6 by using coating composition (I) obtained above.

4. Test Result

The coated lens was subjected to the following tests. The results are shown in Table 3 below.

(a) Abrasion Resistance Test 0.08 of carborundum #600 was deposited on a pad having a diameter of 30 mm and made of wool felt (available from NIHON FELT KABUSHIKI KAISHA, 20 JRW, 2 mm thickness). This pad was placed on the convex surface of the lens, and was rotated at a speed of 8 rpm. The pad was also moved forward and rearward at a speed of 143 times/min. under a load of 130 g. After this movement was carried out for 14 min, the increase in the haze in the surface of the lens was observed. The untreated CR-39 lens had the value of 22.0%.

(b) Appearance

The test was carried out in a manner as described in Example 1.

(c) Adhesion

The test was carried out in a manner as described in Example 1.

(d) Anti-Fogging Test

The test was carried out in a manner as described in Example 1.

TABLE 2

| Temperature of Heated Water Treatment | C/Si Wt. Ratio Surface Layer | C/Si Wt. Ratio Total Film | Water Resistance | Adhesion | Appearance | Anti-Fogging |
|---|---|---|---|---|---|---|
| 70° C. | 1.7 | 1.5 | Good | Good | Good | No Fogging |
| 80° C. | 1.8 | 1.5 | " | " | " | " |
| 90° C. | 1.9 | 1.5 | " | " | " | " |
| 100° C. | 2.3 | 1.5 | " | " | " | " |
| NONE* | 1.5 | 1.5 | " | " | " | Fogging occurs immediately after breath |

*Comparative Example 4

EXAMPLE 7

1. Preparation of Methyl Trimethoxy Silane Hydrolysate 136 g of methyl trimethoxy silane was charged to a reaction vessel provided with a rotor and the liquid

EXAMPLE 8

1. Preparation of Vinyl Triethoxy Silane Hydrolysate

Vinyl triethoxy silane hydrolysate was prepared in a manner as described in Example 2-1.

2. Preparation of Coating Composition

A coating composition (J) was prepared in a manner as described in Example 6, except that 32.3 g of vinyl triethoxy silane hydrolysate obtained above was used in lieu of the γ—glycidoxypropyl trimethoxy silane hydrolsate.

3. Coating, Curing and Wet Heat Treatment

The coating, curing, and wet heat treatment (at 90° C.) were carried out in a manner as described in Example 6, by using the coating composition (J) obtained above.

4. Test Result

The tests were carried out in a manner as described in Example 7. The results are shown in Table 3 below.

EXAMPLE 9

1. Preparation of γ—Glycidoxypropyl Methyl Diethoxy Silane Hydrolysate 386.3 g of γ—glycidoxypropyl methyl diethoxy silane was charged to a reaction vessel provided with a rotor and the liquid was maintained at a temperature of 10° C. While the liquid was agitated with a magnetic stirrer, 55.8 g of a 0.05 N aqueous hydrochloric acid solution was gradually added dropwisw thereto. After the completion of the dropwise addition, the cooling was stopped. Thus, the hydrolysate of γ—glydidoxypropyl methyl diethoxy silane was obtained.

2. Preparation of Coating Composition

Coating composition (K) was prepared in a manner as described in Example 6, except that 17.0 g of γ—glycidoxypropyl methyl diethoxy silane hydrolysate was used in lieu of γ—glycidoxypropyl trimethoxy silane hydrolsate.

3. Coating, Curing and Wet Heat Treatment

The coating, curing, and wet heat treatment (at 90° C.) were carried out in a manner as descried in Example 6, by using coating composition (K) obtained above.

4. Test Result

The tests were carried out in a manner as described in Example 7. The results are shown in Table 3.

EXAMPLE 10

1. Preparation of β—(3,4-Epoxy Cyclohexyl) Ethyl Trimethoxy Silane Hydrolysate 246 g of β—(3,4-epoxy cyclohexyl) ethyl trimethoxy silane hdyrolysate was charged to a reaction vessel provided with a rotor and the liquid was maintained at a liquid temperature of 10° C. While the liquid was agitated with a magnetic stirrer, 54 g of a 0.01N aqueous hydrochloric acid solution was gradually and dropwise added thereto. After the completion of the dropwise addition, the cooling was stopped. Thus, the hydrolysate of β—(3,4-epoxy cyclohexyl) ethyl trimethoxy silane was obtained.

2. Preparation Coating Composition

Coating composition (L) was prepared in a manner as described in Example 6, except that 17.7 g of β—(3,4-epoxy cyclohexyl) ethyl trimethoxy silane hydrolysate was used in lieu of γ—glycidoxypropyl trimethoxy silane hydrolysate.

3. Coating, Curing and Wet Heat Treatment

The coating, curing and wet heat treatment (at 90° C.) were carried out in a manner as described in Example 6, by using coating composition (L) prepared above.

4. Test Result

The tests were carried out in a manner as described in Example 7, the test results are shown in Table 3 below.

EXAMPLE 11

Example 6 was repeated, except that the substrate was changed to a glass lens and the wet heat treatment was carried out at a temperature of 90° C. The tests were carried out in a manner as described in Example 7, the test results are shown in Table 3 below.

TABLE 3

| | C/Si Wt. Ratio | | Test Result | | | |
|---|---|---|---|---|---|---|
| Example No. | Surface Layer | Total Film | Abrasion Resistance Test (%) | Appearance | Adhesion | Anti-Fogging |
| Example 7 | 1.7 | 1.3 | 5.3 | Good | Good | No Fogging |
| Example 8 | 1.8 | 1.4 | 2.8 | " | " | " |
| Example 9 | 2.0 | 1.5 | 3.8 | " | " | " |
| Example 10 | 2.0 | 1.6 | 3.5 | " | " | " |
| Example 11 | 1.9 | 1.5 | 6.2 | " | " | " |

EXAMPLE 12 AND COMPARATIVE EXAMPLE 5

The preparation of the coating composition, coating and curing were carried out in a manner as described in Example 6.

1. Abrasion Treatment

The coated surface was wiped about 100 times as uniformly as possible by hand using non-woven gauze for bandage (HAIZE GAUZE, available from ASAHI KASEI KOGYO KABUSHIKI KAISHA).

2. Test Result

The lens coated and subjected to the above-mentioned abrasion treatment was tested in a manner as described in Example 6 above. The test results are shown in table 4 below.

COMPARATIVE EXAMPLE 5

Example 6 was repeated, except that the abrasion treatment was not carried out. The test results are shown in Table 4 below.

TABLE 4

| | C/Si Wt. Ratio | | Test Result | | | |
|---|---|---|---|---|---|---|
| Example No. | Surface Layer | Total Film | Abrasion Resistance Test (%) | Appearance | Adhesion | Anti-Fogging Test |
| Example 12 | 1.8 | 1.5 | 6.7 | Good | Good | No Fogging |
| Comparative | 1.5 | 1.5 | 6.5 | " | " | Fogging in |

TABLE 4-continued

| | C/Si Wt. Ratio | | Test Result | | | |
|---|---|---|---|---|---|---|
| Example No. | Surface Layer | Total Film | Abrasion Resistance Test (%) | Appearance | Adhesion | Anti-Fogging Test |
| Example 5 | | | | | | Entire Surface |

We claim:

1. An anti-fogging coating film comprising a cured film having a surface layer and an underlying layer, each of said layers being derived from components A, B and C and coated on a substrate, the silicon content thereof being 0.7-2.0/1.0 in terms of carbon/silicon weight ratio, and the carbon/silicon weight ratio of the surface layer of the film being larger than that of the underlying layer and being not less than 1.7/1.0 and wherein each layer comprises:
A: 100 parts by weight of polyvinyl alcohol,
B: 60-300 parts by weight of finely divided silica having an average particle size of about 5-200 nm, and
C: 0.5-30 parts by weight of at least one compound selected from the group consisting of organic silicon compounds having a general formula:

$$R^1R_a^2Si(OR^3)_{3-a}$$

wherein $R^1$ is an organic group having 1 to 10 carbon atoms, $R^2$ is a hydrocarbon group having 1 to 6 carbon atoms, $R^3$ is an alkyl, alkoxyalkyl or acyl group and $a=0$ or 1, and the hydrolysates thereof.

2. An anti-fogging film as claimed in claim 1, wherein the thickness of the surface layer is 0.001-$\mu$m.

3. An anti-fogging film as claimed in claim 1, wherein the polyvinyl alcohol of the component A has an average polymerization degree of 250-3,000 and a saponification degree of 70 mol % or more.

4. An article having on the surface thereof, an anti-fogging film comprising a cured film having a surface layer and an underlying layer, each of said layers being derived from components A, B and C and coated on a substrate, the silicon content thereof being 0.7-2.0/1.0 in terms of carbon/silicon weight ratio and the carbon/silicon weight ratio of the surface layer of the film being larger than that of the underlying layer and being not less than 1.7/1.0 and wherein each layer comprises
A: 100 parts by weight of polyvinyl alcohol,
B: 60-300 parts by weight of finely divided silica having an average particle size of about 5-200 nm, and
C: 0.5-30 parts by weight of at least one compound selected from the group consisting of organic silicon compounds having a general formula:

$$R^1R^2Si(OR^2)_{3-a}$$

wherein $R^1$ is an organic group having 1 to 10 carbon atoms, $R^2$ is a hydrogen group having 1 to 6 carbon atoms, $R^3$ is an alkyl, alkoxyalkyl or acyl group and $a=0$ or 1, and the hydrolysates thereof.

5. An article as claimed in claim 4, wherein the article is comprised of a transparent material.

6. An article as claimed in claim 5, wherein the transparent material is glass.

7. An article as claimed in claim 5, wherein the transparent material is plastic.

8. An article as claimed in claim 7, wherein the plastic is diethyleneglycol bisallylcarbonate polymer.

9. An article as claimed in claim 7, wherein the plastic is poly-2,2-di—(p-hydroxyphenyl) propane carbonate.

10. An article as claimed in claim 7, wherein the plastic is acrylic or methacrylic polymer.

11. An article as claimed in claim 7, wherein the plastic is polyester.

12. An article as claimed in claim 5, wherein the article is an eyeglass lens.

* * * * *

UNITED STATES PATENT AND TRADEMARK OFFICE
CERTIFICATE OF CORRECTION

PATENT NO. : 4,478,909
DATED : October 23, 1984
INVENTOR(S) : Takashi Taniguchi & Jiro Mibae It is certified that error appears in the above-identified patent and that said Letters Patent is hereby corrected as shown below:

Claim 2, line 2, please delete "0.001-µm." and substitute --0.001-5µm.--

Signed and Sealed this

Sixteenth Day of July 1985

[SEAL]

Attest:

DONALD J. QUIGG

Attesting Officer     Acting Commissioner of Patents and Trademarks